United States Patent [19]

Freitag

[11] Patent Number: 5,657,227
[45] Date of Patent: Aug. 12, 1997

[54] METHOD AND APPARATUS FOR SIMULATING A MASS OR LOAD ON A STATIONARY TESTING STAND

[75] Inventor: Gernot Freitag, Darmstadt, Germany

[73] Assignee: Schenck Komeg, Pruef- und Automatisierungstechnik GmbH, Eppelborn, Germany

[21] Appl. No.: 485,104

[22] Filed: Jun. 7, 1995

[30] Foreign Application Priority Data

Aug. 9, 1994 [DE] Germany .............. 44 27 966.3

[51] Int. Cl.$^6$ .............................................. G01M 17/00
[52] U.S. Cl. ........................... 364/424.034; 364/578; 73/116; 73/117
[58] Field of Search ................ 364/424.034, 424.04, 364/578, 550, 551.01; 73/116, 117, 117.2, 117.3

[56] References Cited

U.S. PATENT DOCUMENTS

| | | | |
|---|---|---|---|
| 4,621,524 | 11/1986 | Von Thun | 73/116 |
| 4,656,576 | 4/1987 | Kawarabayashi | 73/117 |
| 4,745,799 | 5/1988 | Kawarabayashi et al. | 73/117 |
| 5,465,612 | 11/1995 | La Belle | 73/117 |
| 5,542,290 | 8/1996 | Suzuki | 73/117 |

FOREIGN PATENT DOCUMENTS

| | | |
|---|---|---|
| 1105637 | 4/1961 | Germany . |
| 3347182 | 7/1985 | Germany . |
| 2738325C2 | 3/1987 | Germany . |
| 3812824 | 11/1989 | Germany . |
| 3920277 | 1/1991 | Germany . |

OTHER PUBLICATIONS

Ernst Mirus et al. "Hochgeschwindigkeits–Personen–wagen–Trommelprüfstand mit digitalem Fahrsimulator" Automobiltechnische Zeitschrift 86 (Nov. 1984), pp. 495, 496, 501, 502.

*Primary Examiner*—Gary Chin
*Attorney, Agent, or Firm*—W. G. Fasse; W. F. Fasse

[57] ABSTRACT

A torque moment is simulated in a rotary testing stand for test samples by providing a feed-back closed loop control circuit for controlling a torque moment generator. The feed-back control circuit generates a feed-back control signal by differentiating an angular velocity signal derived from a torque applying shaft and passing the differentiated signal through a proportional time element that has a controllable, variable time constant. Both the differentiating circuit and the time circuit are preferably controlled by a difference signal that represents a difference between the inertia moment of the test sample and the inertia moment of the testing stand. The output signal of the time circuit is compared in a comparator with an actual torque signal. The output of the comparator provides a rated or reference torque signal that is then used for adjusting the output of the torque generator to produce the required simulated torque load.

7 Claims, 1 Drawing Sheet

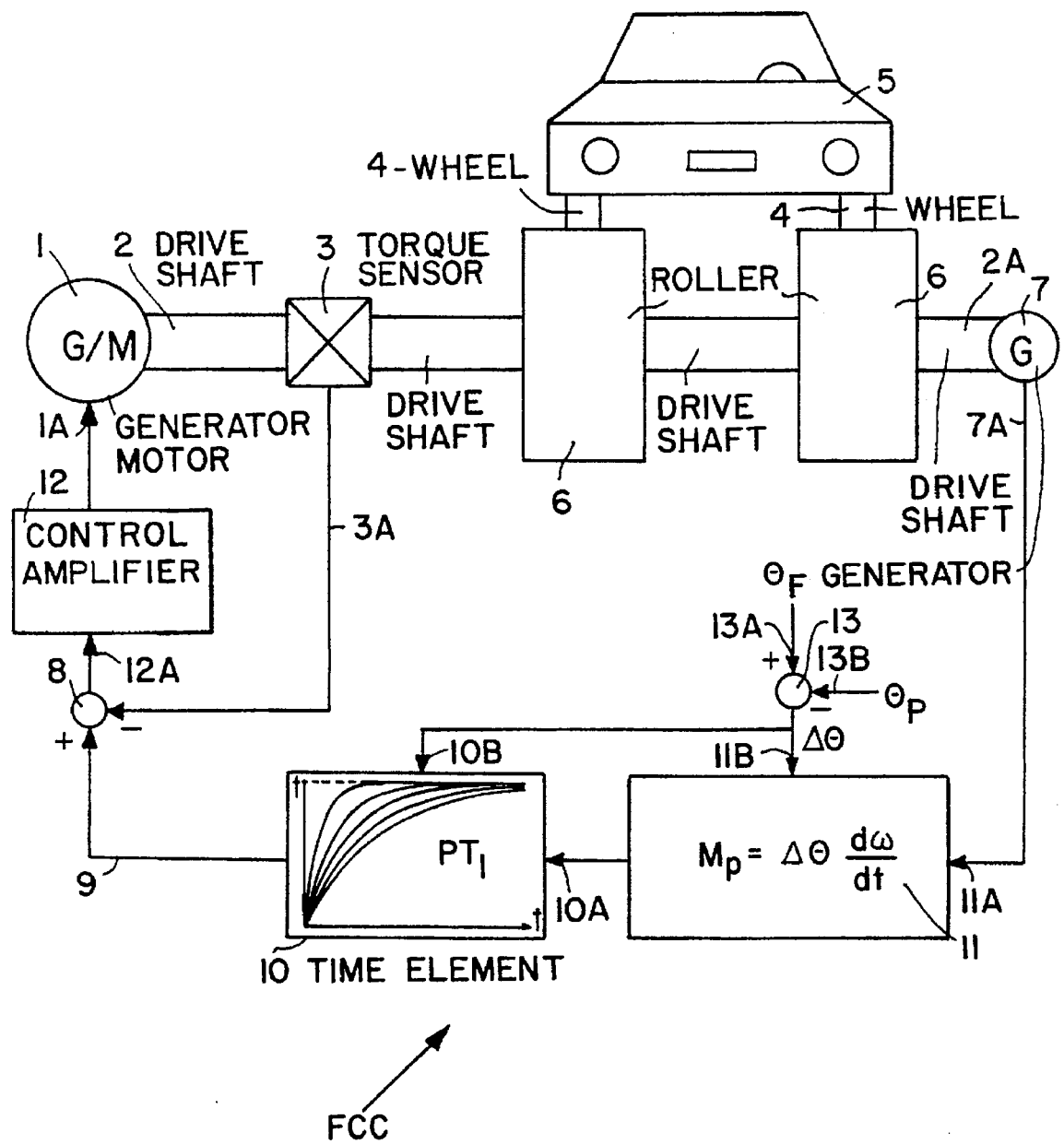

METHOD AND APPARATUS FOR SIMULATING A MASS OR LOAD ON A STATIONARY TESTING STAND

FIELD OF THE INVENTION

The invention relates to a method and to an apparatus for simulating a mass or load on stationary testing stands, especially for testing motor vehicles, whereby at least one set of wheels contacts in a force transmitting manner a set of testing rollers driven in the testing stand by the vehicle wheels and by a load generator such as a direct current motor-generator.

BACKGROUND INFORMATION

The testing of motor vehicles on a stationary testing stand involves the problem of how to exactly simulate the road resistance that occurs when in its actual operation a vehicle travels on a road. Conventionally, so-called roller testing stands are used for the required simulation. The vehicle or vehicle components, such as an axle and wheel set, are arranged on these roller testing stands in a quasi-stationary condition but in a force transmitting manner. Since the vehicle or a vehicle component on the testing stand does not actually move, and since the mass of the testing stand normally does not correspond to the mass of the vehicle or the test sample, it is necessary to simulate at least a difference mass corresponding to the difference between the mass of the vehicle ($M_F$) and the mass of the testing stand ($M_P$).

It is further desirable that such stationary testing stands are capable of simulating any other road resistances by simulation of an additional moment or torque moment. Thus, it is desirable to simulate in the testing stand forces which normally are effective on the vehicle if the vehicle is travelling on a road. For this purpose all translatory, physical magnitudes or values such as the vehicle mass, the force applied by the vehicle etc., are transformed by calculation into rotatory values or magnitudes with the aid of the radius of the testing rollers forming part of the testing stand. The resulting difference mass between the actually available testing stand mass and the vehicle mass to be realized is then simulated electrically with the aid of a load generator coupled to the testing rollers. The difference mass to be realized or simulated is controlled in a dynamic closed loop control circuit causing the load generator to apply a respective simulated load or torque moment to the testing rollers. Conventional circuits of this type are subject to different problems depending on the type of mass simulation method employed. Depending on the small or large positive difference masses, stability problems and closed loop control accuracy problems do occur in conventional testing stands.

German Patent Publication (DE-PS) 1,105,637 (Waller) published Apr. 27, 1961 discloses a so-called differentiating mass simulating method for vehicle testing stands. According to the Waller method the difference mass is simulated by an electric load generator coupled to the running rollers of the testing stand which includes a Ward-Leonard set as a load generator. More specifically, the difference mass to be simulated is electrically generated by the application of an additional torque moment to the axis of the testing stand rollers with the aid of a d.c. motor-generator. For this purpose the load or torque moment to be applied is ascertained indirectly through the acceleration effect of the testing stand mass. The acceleration effect is in turn ascertained by an r.p.m. pick-up such as a tachometer or generator, the output voltage of which is proportional to the r.p.m. of the load application output shaft of the load simulating generator. The output voltage of the r.p.m. pick-up is differentiated to thereby produce a signal proportional to the acceleration. A calculating circuit ascertains from the acceleration proportional signal a load or torque moment which corresponds to the rated or reference torque value of the mass component to be simulated, whereby the calculating circuit also takes into account the known vehicle inertia moment and the known testing stand inertia moment. The rated or reference value is then used to produce a closed loop control signal for controlling the load generator for adjusting the load or torque moment applied to the testing stand rollers by the load generator. This type of closed loop differentiating feed-back control results in a non-stable closed loop control characteristic, especially when there are large mass differences between the mass of the testing stand and the mass of the sample such as a vehicle on the testing stand.

German Patent Publication (DE-PS) 2,738,325 C2 (Fegraus et al.) published on Mar. 2, 1978 describes a so-called integrating mass simulation method, wherein the mass to be simulated is derived from the integration of the measured torque moment and from the known inertia masses of the vehicle and of the testing stand. The known system includes a calculating circuit which calculates from the measured torque moment signal by integration a rated or reference r.p.m. which then serves for controlling the load application generator in closed loop fashion. Thus, the mass simulation is generated by the closed loop r.p.m. control of a d.c. motor generator functioning as a load generator. The system of Fegraus et al. avoids the drawbacks of the differentiating mass simulating method according to Waller. However, this integrating feed-back control method also results in an unstable closed loop control characteristic, especially for small mass differences between the testing stand mass and the vehicle mass.

A combination of the differentiating simulating method with the integrating simulating method would require two separate closed loop control systems. Further, practical experience has shown that especially in the area of the control characteristic where unfavorably large or small mass differences occur, it is not possible to achieve a satisfactory closed loop control accuracy or quality. This is particularly true in areas of large mass differences between the testing stand mass and the vehicle mass.

OBJECTS OF THE INVENTION

In view of the above it is the aim of the invention to achieve the following objects singly or in combination:

to avoid the drawbacks of the conventional differentiation method and the conventional integration method by providing a method and apparatus for simulating a mass in a testing stand with the required control accuracy and control stability over a large range of differences between the mass of the testing stand ahd the mass of the sample being tested, such as a vehicle;

to apply simulating testing loads to a vehicle which permit testing the vehicle under simulated conditions which substantially correspond to real driving conditions on the road; and to avoid combining an integrating control system with a differentiating control system.

SUMMARY OF THE INVENTION

The above objects have been achieved according to the invention in that according to the present method a closed loop control signal for adjusting the simulated load actually applied to testing rollers, e.g. as a torque moment, is generated as a torque moment rated or reference value on the basis of the actual velocity or r.p.m. of the load applicator. The respective signal is processed through a controllable time element having a controllable or variable time constant. Preferably, the output signal of an r.p.m. pick-up is first differentiated and then passed through the controllable time element. The output of the controllable time element in turn is compared with an actual torque signal and the result of the comparing provides the closed loop control signal for a torque generator. Further, and preferably, the differentiation and the time element are both controlled by a signal that represents the difference between the mass inertia moment of the test sample such as a vehicle and the mass inertia moment of the test stand.

The apparatus according to the invention for performing the present method is characterized in that a speed or r.p.m. pick-up, up, such as a tacho-generator, is connected to the output of a load generator such as a motor -generator and a closed loop control circuit receives the r.p.m. signal to produce a closed loop control signal for the load generator. For this purpose a differentiating circuit connected in series with a controllable time element is connected with its input to the output of the r.p.m. pick-up. The output of the differentiating circuit is connected to an input of the controllable time element and preferably both are controlled by a signal produced by a subtraction circuit which subtracts the inertia moment of the testing stand from the inertia moment of the vehicle to produce a respective difference signal for controlling the differentiating circuit and the time element. The output of the time element is connected to a comparator circuit which compares the output signal of the time element with an actual torque moment signal sensed by a torque pick-up from the output of the load generator. The comparator produces a closed loop control signal that represents the rated or reference torque moment signal which is preferably passed through a control amplifier to control the load generator to produce the required mass simulation.

The time element is preferably a first order low-pass filter $PT_1$ having a variable, controllable time constant connected in the closed loop feed-back circuit between the output of the differentiating circuit and one input of the comparator. The first order low-pass filter $PT_1$ is controlled so that its time constant depends on the difference of the inertia masses of the vehicle and the testing stand to thereby produce a control signal that represents the inertia mass to be simulated. This type of control of the time constant of the time element results in a large time constant in response to a large difference in the inertia moments and in a small time constant in response to a small difference in the inertia moments. In both instances the mass inertia moment of the vehicle needs to be equal to or larger than the mass inertia moment of the testing stand so that the difference is either zero or larger than zero.

The invention has the advantage that a uniform control speed is achieved over the entire feed-back control range. Another advantage of the invention is seen in that conventional testing stands can be easily equipped with the features of the invention provided that the testing stands are employing the differentiating method.

Yet another important advantage of the invention is seen in that even large mass differences between the sample and the stand can be simulated with accuracy in but one closed loop feed-back circuit with the added advantage that mechanical replacement masses are not needed. Furthermore, the present invention can be incorporated for simulating a mass in so-called flat belt testing stands that use a driven belt rather than rollers, in engine testing stands, in gear box testing stands, and in brake testing stands.

BRIEF DESCRIPTION OF THE DRAWINGS

In order that the invention may be clearly understood, it will now be described, by way of example, with reference to the accompanying drawings, wherein the single FIGURE shows a block diagram of a feed-back circuit according to the invention for simulating a mass on a testing stand.

DETAILED DESCRIPTION OF A PREFERRED EXAMPLE EMBODIMENT AND OF THE BEST MODE OF THE INVENTION

The drawing shows a load generator 1 in the form of a direct current generator/motor coupled with its output through a drive shaft 2 to support-rollers 6 of a stationary testing stand for a test sample such as a vehicle 5 that engage the rollers 6 with at least one set of vehicle wheels 4 for the performance of a testing sequence. A torque sensor 3 is connected to the output or drive shaft 2 to provide a measured or actual torque signal on a conductor 3A. The output shaft 2 has an output drive shaft end 2A connected to a pick-up 7 such as a tacho-generator to provide a speed or r.p.m. representing output signal on a conductor 7A. The wheels 4 and the rollers 6 contact each other in a force transmitting manner.

A closed loop feed-back control circuit FCC according to the invention comprises a differentiating circuit 11 connected with one of its inputs 11A to the conductor 7A to receive the r.p.m. or speed representing signal from the pick-up 7. The output of the differentiating circuit 11 is connected according to the invention to one input 10A of a time element 10 having a controllable variable time constant. A proportional time element namely a first order low-pass filter ($PT_1$) is suitable for the present purposes. A conductor 9 connects the output of the time element 10 to one input of a comparator 8, the other input of which is connected through the conductor 3A to the torque sensor 3. The comparator 8 produces a closed loop control signal that is supplied to an input 12A of a control amplifier 12 which in turn provides the closed loop control signal to a control input 1A of the load generator 1 which is a d.c. motor-generator.

Both the differentiating circuit 11 and the time element 10 are preferably controlled by a control signal $\Delta\theta$ that is formed by a subtraction circuit 13 which receives at one input 13A a signal representing the known inertia moment $\theta_F$ of the vehicle 5 and at the other input 13B a signal representing the known inertia moment $\theta_P$ of the testing stand. The difference signal $\Delta\theta$ is supplied to the control input 11B of the differentiating circuit 11 and to the control input 10B of the time element 10. It is also possible to directly feed the signals representing these known mass inertia moments $\theta_F$ and $\theta_P$ to the respective differentiating circuit 11 and time element 10 or to store these inertia moments in respective memories for use when needed.

The just described testing stand with its closed loop control circuit according to the invention performs the present method as follows. The wheels 4 of the vehicle 5 driven by the engine of the vehicle drive the rollers 6 of the testing stand. As a result, the r.p.m. pick-up 7 and the load generator 1 are simultaneously driven through the shaft 2. The r.p.m. pick-up 7 produces a signal on the conductor 7A. This signal is proportional to the speed or the angular speed $\omega$ of the shaft 2, 2A. The load or torque moment required for the mass simulation is generated by the load generator 1 which provides a torque load moment controlled by the control amplifier 12 functioning as a torque controller in response to the signal at the output of the comparator 8 as described above.

The actual physically present inertia moment $\theta_P$ of the testing stand is subject to two torque moments namely the testing stand torque moment $M_P$ and the vehicle torque moment $M_F$. Therefore, it can be assumed that a correct mass simulation is achieved only if the testing stand torque moment $M_P$ is predetermined in such a way that the inertia moment $\theta_P$ of the testing stand is subjected to the same acceleration as the vehicle 5 on a road under the influence of the vehicle torque moment $M_F$ alone on the road. However, the vehicle torque moment $M_F$ at such an ideal mass simulation is directly measurable only in rare instances. Therefore, the vehicle torque moment $M_F$ must normally be ascertained indirectly on the basis of its acceleration effect ($d\omega/dt$) on the testing stand inertia moment $\theta_P$. For mathematically ascertaining the vehicle torque moment $M_F$ one must start from the assumption that the mass acceleration of the entire testing stand is as large as the acceleration of the vehicle 5 (steady state assumption). Thus, a conclusion can be made based on the ascertained acceleration ($d\omega/dt$) and on the known vehicle inertia moment $\theta_F$ regarding the vehicle torque moment $M_F$ that is to be ascertained. Further, a rated torque moment $M_r$ is mathematically ascertained as follows: $M_r = (\theta_F - \theta_P) \, d\omega/dt$.

Based on the above mathematical relationship, it is possible to derive the torque moment to be produced for simulation and to further derive the roller acceleration in the stationary condition. Without controlling the time constant T of the time element 10 as taught by the invention the structure for the mass simulation corresponds to that used when applying the differentiating method. In such a method the differentiation of the angular velocity signal ($d\omega/dt$) and the given or known mass inertia moment $\theta_F$ of the vehicle 5 and the mass inertia moment $\theta_P$ of the testing stand, yield a variable rated signal on the basis of which the control amplifier 12 will provide the required control or adjustment signal which in turn will yield the desired load that corrects the testing stand inertia moment $M_P$. Stated differently, based on the available information $d\omega/dt$, $\theta_F$, and $\theta_P$ the above mentioned variable rated torque moment $M_P$ or reference value is ascertained, passed through the time element 10, and compared in the comparator 8 with the actual torque moment as measured by the sensor 3. If there is a deviation the control amplifier 12 will control or adjust the generator 1 in such a way that the output torque on the shaft 2 will provide the required mass simulation.

According to the invention the closed loop control circuit described above is modified so that the formation of a variable reference torque signal does not lead to instabilities of the closed loop feed-back circuit and so that a wide range of differences between the inertia moment of the vehicle or test sample and the testing stand can be accommodated. For this purpose, the circuit according to the invention includes the differentiating circuit 11 connected in series with the time element 10 having a controllable, variable time constant T for controlling both the time element 10 and the differentiating circuit 11 by the output signal $\Delta\theta$ from the subtraction circuit 13. As a result, the time constant T of the time element 10 is varied in synchronism with the difference of a variable mass inertia moment $$\Delta\theta = \theta_F - \theta_P$$

The differentiating circuit 11 constantly recalculates during a testing control sequence a variable torque moment rated or reference value in accordance with the difference value provided by the subtraction circuit 13. As mentioned above the time element 10 is a conventional $PT_1$ circuit or low-pass filter in which according to the invention the time constant is varied proportionally to the difference mass inertia moment $\Delta\theta$. The time element 10 is constructed to have a proportionality constant c so that the time constant T corresponds to the relationship $$T = c \cdot \Delta\theta$$

Since the time constant can assume only positive values the just described mass simulation may be applied only for difference values of the mass inertia moments in which the mass inertia moment $\theta_F$ of the vehicle or test sample is equal or larger than the mass inertia moment $\theta_P$ of the testing stand. By a suitable dimensioning of the time element 10, it is thus possible to achieve an advantageous compromise between the desired control accuracy or quality of the closed loop feed-back circuit on the one hand and the mass simulation on the other hand to achieve a satisfactory stable and smooth reference or rated torque moment value. For this purpose it is also necessary that the amplification factor of the time element 10 is equal to one to assure a sufficiently precise mass simulation. The time element 10 designed and controlled as just described achieves a stabilizing of the dynamic closed loop feed-back control circuit FCC that is capable to even handle a large range of mass differences between the mass of the test sample and the mass of the testing stand.

The closed loop control circuit FCC may be realized as a hardware circuit or it may be realized in a computer through a respective software approach. These closed loop controls according to the invention for the described mass simulation are not only suitable for a vehicle testing stand, but are equally applicable to any testing stands requiring a mass simulation, such as engine testing stands, gear box testing stands, and brake testing stands. The test samples are coupled to the respective load output of the testing stand in a torque transmitting manner.

Although the invention has been described with reference to specific example embodiments, it will be appreciated that it is intended to cover all modifications and equivalents within the scope of the appended claims.

What is claimed is:

1. A method for simulating a mass in a testing stand including a load generator having a control input and a load output connectable in a force transmitting manner to a sample to be tested, comprising the following steps:

(a) sensing a first actual velocity representing signal corresponding to an actual velocity of said load output, (b) producing a difference signal ($\Delta\theta$) from a known mass inertia moment ($\theta_F$) of said sample and from a known mass inertia moment ($\theta_P$) of said testing stand, (c) differentiating said first actual velocity representing signal and said difference signal ($\Delta\theta$) in a differentiator (11) to produce a differentiated rated load signal ($M_R$);

(d) controlling with said difference signal ($\Delta\theta$), a controllable time element (10) having a variable time constant (7), (e) passing said rated load signal ($M_R$) through said controllable time element (10) to produce a time varied rated load value, (f) sensing from said load output a second signal representing an actual load value from said load output, (g) comparing said time varied rated load value with said actual load value to produce a control signal representing a simulated mass, and (h) controlling said load generator with said control signal to produce a corrected torque moment that represents a load torque moment corresponding to said simulated mass which is applied to said sample to be tested.

2. The method of claim 1, wherein said mass inertia moment ($\theta_F$) of said sample is larger than or equal to said mass inertia moment ($\theta_P$) of said testing stand.

3. The method of claim 1, further comprising performing said steps (a) to (h) in connection with a vehicle testing stand.

4. An apparatus for simulating a mass or load in a testing stand comprising: a load generator (1), a drive shaft connecting said load generator (1) for applying a load to a testing sample (4, 5), a velocity pick-up (7) connected to said load generator through said drive shaft for providing a velocity signal, a differentiating circuit (11) connected to said pick-up (7) for differentiating said velocity signal, a time element (10) having a controllable variable time constant (T) connected to said differentiating circuit (11), a subtraction circuit (13) connected to said differentiating circuit (11) and to said time element (10) for supplying a difference signal ($\Delta\theta$) representing an inertia moment difference to said differentiating circuit and to said time element (10), whereby said variable time constant (T) of said time element (10) is varied by said difference signal ($\Delta\theta$) for providing a time varied rated load value, a torque sensor (3) positioned for sensing an actual torque value produced by said load generator (1), a comparator (8) connected to said time element (10) and to said torque sensor (3) for producing a control signal representing a simulated mass, a control amplifier (12) connected to said comparator (8) and to said load generator (1) for controlling said load generator (1) in response to said control signal representing said simulated mass.

5. The apparatus of claim 4, wherein said time element (10), said differentiating circuit (11), and said subtraction circuit (13) are integrated into a common circuit.

6. The apparatus of claim 4, wherein said pick-up (7), said differentiating circuit (11), said time element (10), said comparator (8), and said control amplifier (12) are interconnected as a closed loop control.

7. The apparatus of claim 6 further comprising a computer and wherein said closed loop control and said subtraction circuit (13) are implemented in said computer.

* * * * *

UNITED STATES PATENT AND TRADEMARK OFFICE
CERTIFICATE OF CORRECTION

PATENT NO. : 5,657,227
DATED : August 12, 1997
INVENTOR(S) : Freitag

It is certified that error appears in the above-indentified patent and that said Letters Patent is hereby corrected as shown below:

| | |
|---|---|
| Col. 2 line 54 | replace "ahd" by --and--; |
| Col. 3 line 18 | replace "pick-up, up," by --pick-up,--; |
| Col. 3 line 19 | replace "-generator" by --generator--; |
| Col. 4 line 16 | replace "support-rollers" by --support rollers--; |
| Col. 5 line 26 | replace "$M_r$" by --$M_R$--; |
| Col. 5 line 27 | replace "$M_r$" by --$M_R$--; |
| Col. 5 line 43 | replace "$M_P$" by --$M_R$--; |

Signed and Sealed this

Twenty-eighth Day of October, 1997

*Attest:*

BRUCE LEHMAN

*Attesting Officer*  Commissioner of Patents and Trademarks